United States Patent
Brown et al.

(10) Patent No.: US 6,466,929 B1
(45) Date of Patent: Oct. 15, 2002

(54) SYSTEM FOR DISCOVERING IMPLICIT RELATIONSHIPS IN DATA AND A METHOD OF USING THE SAME

(75) Inventors: Steven D. Brown; Kristen L. Mello, both of Newark, DE (US)

(73) Assignee: University of Delaware, Newark, DE (US)

( * ) Notice: Subject to any disclaimer, the term of this patent is extended or adjusted under 35 U.S.C. 154(b) by 0 days.

(21) Appl. No.: 09/439,010

(22) Filed: Nov. 12, 1999

Related U.S. Application Data

(60) Provisional application No. 60/108,232, filed on Nov. 13, 1998.

(51) Int. Cl.[7] .......................... G06F 17/00; G06F 15/18
(52) U.S. Cl. ........................................ 706/48; 706/61
(58) Field of Search ..................... 706/48, 61

(56) References Cited

U.S. PATENT DOCUMENTS

| | | | |
|---|---|---|---|
| 5,615,112 A | * 3/1997 | Liu Sheng et al. | 707/104.1 |
| 5,787,274 A | 7/1998 | Agrawal et al. | 707/102 |
| 5,799,311 A | 8/1998 | Agrawal et al. | 707/102 |
| 5,802,256 A | 9/1998 | Heckerman et al. | 706/59 |
| 5,802,507 A | 9/1998 | Gentric et al. | 706/25 |
| 5,805,730 A | 9/1998 | Yaeger et al. | 382/228 |
| 5,805,731 A | 9/1998 | Yaeger et al. | 382/228 |
| 5,805,776 A | 9/1998 | Juengst et al. | 706/59 |
| 5,809,499 A | 9/1998 | Wong et al. | 707/6 |
| 5,812,992 A | 9/1998 | de Vries | 706/25 |
| 5,819,007 A | 10/1998 | Elghazzawi | 706/46 |
| 5,819,242 A | 10/1998 | Matsuoka et al. | 706/2 |
| 5,828,812 A | 10/1998 | Khan et al. | 706/2 |
| 6,327,574 B1 | * 12/2001 | Kramer et al. | 705/14 |

OTHER PUBLICATIONS

B. Ripley, *Pattern Recognition and Neural Networks*, (Cambridge University Press 1996).
M. Sharaf et al., *Chemometrics*, (Wiley 1986).
G. McLachlan, *Discriminant Analysis and Statistical Pattern Recognition* (Wiley 1992).
P. Langley et al., *Proceedings of the Tenth National Conference on Artificial Intelligence*, "An Analysis of Bayesian Classifiers," pp. 223–228 (AAAI Press 1992).

(List continued on next page.)

*Primary Examiner*—George B. Davis
(74) *Attorney, Agent, or Firm*—Connolly Bove Lodge & Hutz LLP

(57) ABSTRACT

A data processing and analysis system, and a method of using the same, for discovering implicit relationships in data. The method is executed in a computer system capable of receiving input data comprised of expert knowledge, empirical data, and user-defined constraints for any application domain. The system and method provide any preprocessing the input data may require, and perform feature selection and extraction on the input data. Further, the system and method generate a graphical representation of the implicit relationships in the input data, indicating relationships between both class variables and feature variables. Also generated is a classifier that provides a semantic and statistical justification of its classification results which further provides: statistical relevancy of the data set, including an indication of the undersampled regions of the data space; a data analysis specific to a desired level of confidence; and a sound decision theoretical foundation for classification thresholding. The system and method generate a classifier capable of classifying a sample with respect to any variable, handle missing data values, and provide a complete data analysis.

3 Claims, 2 Drawing Sheets

OTHER PUBLICATIONS

P. Langley and S. Sage, *Proceedings of the Tenth National Conference on Uncertainty in Artificial Intelligence*, "Induction of Selective Bayesian Classifiers," pp. 399–406 (Morgan Kaufmann 1994).

D. Heckerman and C. Meek, *Proceedings of the Thirteenth Conference on Uncertainty in Artificial Intelligence*, "Models and Selection Criteria for Regression and Classification," pp. 223–228 (Morgan Kaufmann 1997).

D. Heckerman, 1 *Data Mining and Knowledge Discovery*, "Bayesian Networks for Data Mining," pp. 79–119 (1997).

C. Wellington and D. Bahler, *Predictive Toxicology of Chemicals: Experiences and Impact of AI Tools*, "Predicting Rodent Carcinogencity by Learning Bayesian Classifiers," pp. 131–134 (AAAI 1999).

* cited by examiner

SYSTEM FOR DISCOVERING IMPLICIT RELATIONSHIPS IN DATA AND A METHOD OF USING THE SAME

The present application is based upon Provisional Application Serial No. 60/108,232, filed Nov. 13, 1998.

BACKGROUND OF THE INVENTION

A. Field of the Invention

The present invention relates generally to data processing and analysis systems and methods and, more particularly, to (1) a computer-based data processing and analysis system which performs data exploration, knowledge acquisition, and reasoning under conditions of uncertainty for discovering implicit or latent relationships in data and (2) a method of using the same.

B. Description of the Related Art

Data exploration (sometimes called "data mining") involves the development and use of tools that analyze large data sets in order to extract useful, but often hidden (or "latent") information from them. Information extracted from a particular database can be used to identify patterns of characteristics (features) and groupings (classes) of samples in the data. If the feature patterns of samples in each class are sufficiently similar within that class and are sufficiently dissimilar to the overall feature patterns of the other classes, then the feature patterns of each class may be used to develop classification rules for separating the different classes within that domain. The resulting classification rules may then be used to predict to which class a new and unclassified sample may belong based upon that new sample's feature pattern. A "classifier," or classification tool, is the culmination of such classification rules that are generated from input data called a training set.

Conventional classification techniques typically include some kind of data exploration method that derives the classification rules. Although many classification methods already exist, they are all affected by one or more of three factors: (1) lack of interpretability, (2) assumptions made about the data when building a classifier, and (3) data requirements. The first factor is a question of how semantically interpretable the classification rules and analysis results are. In some cases, such as chemical process monitoring, it is vital that a user be able to understand exactly what factors will allow discrimination between the classes. In other situations, however, only the result is of importance and, therefore, the semantic interpretability is not as important an influence on the choice of classification method. The second factor limits the usefulness of the resulting classifier if the assumptions made when applying the classification technique are inappropriate for the given data set. The third factor affects those classification methods that require a specific size data set, or require the classes to have equivalent properties in terms of membership number or other properties such as covariance structure.

For example, classifiers such as neural networks and soft independent modeling of class analogy (SIMCA) result in classification rules that are quite challenging to interpret semantically, and usually require large amounts of data. See B. Ripley, *Pattern Recognition and Neural Networks* (Cambridge University Press 1996); and M. Sharaf et al., *Chemometrics* (Wiley 1986). Standard statistical discriminant analysis techniques, although fairly easy to interpret, inherently make assumptions about the structures of the underlying classes in the data which limits their validity and effectiveness when these assumptions cannot be justified with real-world data. See Ripley, supra; and G. McLachlan, *Discriminant Analysis and Statistical Pattern Recognition* (Wiley 1992).

None of the classification techniques mentioned above performs reasoning under uncertainty (a term that, in this case, refers to providing a classification when not all of the evidence about a sample is either known or known with absolute certainty). Although many classification techniques have been developed using fuzzy logic for use in such situations, as with many other classification methods, the fundamental assumptions of fuzzy logic and the shape of the classes' membership functions cannot always be justified with real-world data. Recently Bayesian networks (or belief networks) have been used as classifiers to perform classifications under conditions of uncertainty. See, e.g., P. Langley et al., *Proceedings of the Tenth National Conference on Artificial Intelligence* (AAAI Press 1992); P. Langley and S. Sage, *Proceedings of the Tenth National Conference on Uncertainty in Artificial Intelligence* (Morgan Kaufmann 1994); D. Heckerman and C. Meek, *Proceedings of the Thirteenth Conference on Uncertainty in Artificial Intelligence* (Morgan Kaufinann 1997); and D. Heckerman, 1 *Data Mining and Knowledge Discussion* 79 (1997). Unfortunately, Bayesian networks require making assumptions about the distributions of the underlying classes in the data, and are therefore not an optimum choice for many real-world applications, as can be seen from the results seen in C. Wellington and D. Bahler, *Predictive Toxicology of Chemicals: Experiences and Impact of AI Tools* (AAAI 1999).

SUMMARY OF THE INVENTION

An object of the invention is to provide a data exploration and analysis method that will discover implicit, or hidden, relationships in data, upon which classifiers may be constructed, without falling prey to limitations due to unfounded assumptions, lack of interpretability, or restrictive data requirements shown in conventional classification techniques and data exploration methods.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a data processing and analysis system for discovering implicit relationships in data, including: means for inputting empirical data, expert domain knowledge, domain conditions, and new sample data; a computing means for receiving the empirical data and expert domain knowledge from the inputting means, the computing means having a memory means connected to a processing means, wherein the processing means stores the empirical data and expert domain knowledge in the memory means, pre-processes the empirical data and expert domain knowledge, selects and extracts features from the empirical data and expert domain knowledge, generates correlation matrices, derives conditional probability tables, calculates posterior probabilities, creates a domain model, incorporating any user-defined domain conditions, for storage in the memory means, provides an output signal representative of the domain, and provides an output signal representing a classification of the new sample data; and means for receiving the output signal representative of the domain and the output signal representing the classification of the new sample data, for graphically displaying the representation of the domain, and for displaying the classification of the data set.

To further achieve the objects, the present invention comprises a data processing and analysis method in a computer system for discovering implicit relationships in data using an input means and a display means connected to a computing means having a memory means connected to a processing means, the method including the steps of: inputting empirical data, expert domain knowledge, domain conditions, and sample data to the computing means, via the input means; receiving the empirical data and expert domain knowledge in the computing means; utilizing the processing means to store the empirical data and expert domain knowledge in the memory means, to pre-process the empirical data and expert domain knowledge, to select and extract features from the empirical data and expert domain knowledge, to generate correlation matrices, to derive conditional probability tables, to calculate posterior probabilities, to create a domain model, incorporating any user-defined domain conditions, for storage in the memory means, to provide an output signal representative of the domain, and to provide an output signal representing a classification of the new sample data; receiving the output signal representative of the domain and the output signal representing the classification of the new sample data in the display means; graphically displaying the representation of the domain on the display means; and displaying the classification of the data set on the display means.

To still further achieve the objects, the present invention comprises a computer program product for use with a computer system for directing the system to discover implicit relationships in data, the computer program product including: a computer readable medium; means, provided on the computer readable medium, for directing the system to receive empirical, expert domain knowledge, domain conditions, and new sample data; means, provided on the computer readable medium, for storing the empirical data and expert domain knowledge in the computer readable medium; means, provided on the computer readable medium, for pre-processing the empirical data and expert domain knowledge; means, provided on the computer readable medium, for selecting and extracting features from the empirical data and expert domain knowledge; means, provided on the computer readable medium, for generating correlation matrices; means, provided on the computer readable medium, for deriving conditional probability tables; means, provided on the computer readable medium, for calculating posterior probabilities; means, provided on the computer readable medium, for creating a domain model, incorporating any user-defined domain conditions, for storage in the computer readable medium; means, provided on the computer readable medium, for providing an output signal representative of the domain, and an output signal representing a classification of the new sample data; means, provided on the computer readable medium, for receiving the output signal representative of the domain and the output signal representing the classification of the new sample data in the display means; means, provided on the computer readable medium, for graphically displaying the representation of the domain on a display means; and means, provided on the computer readable medium, for displaying the classification of the data set on the display means.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DESCRIPTION OF THE PREFERRED EMBODIMENT

Figure 1:
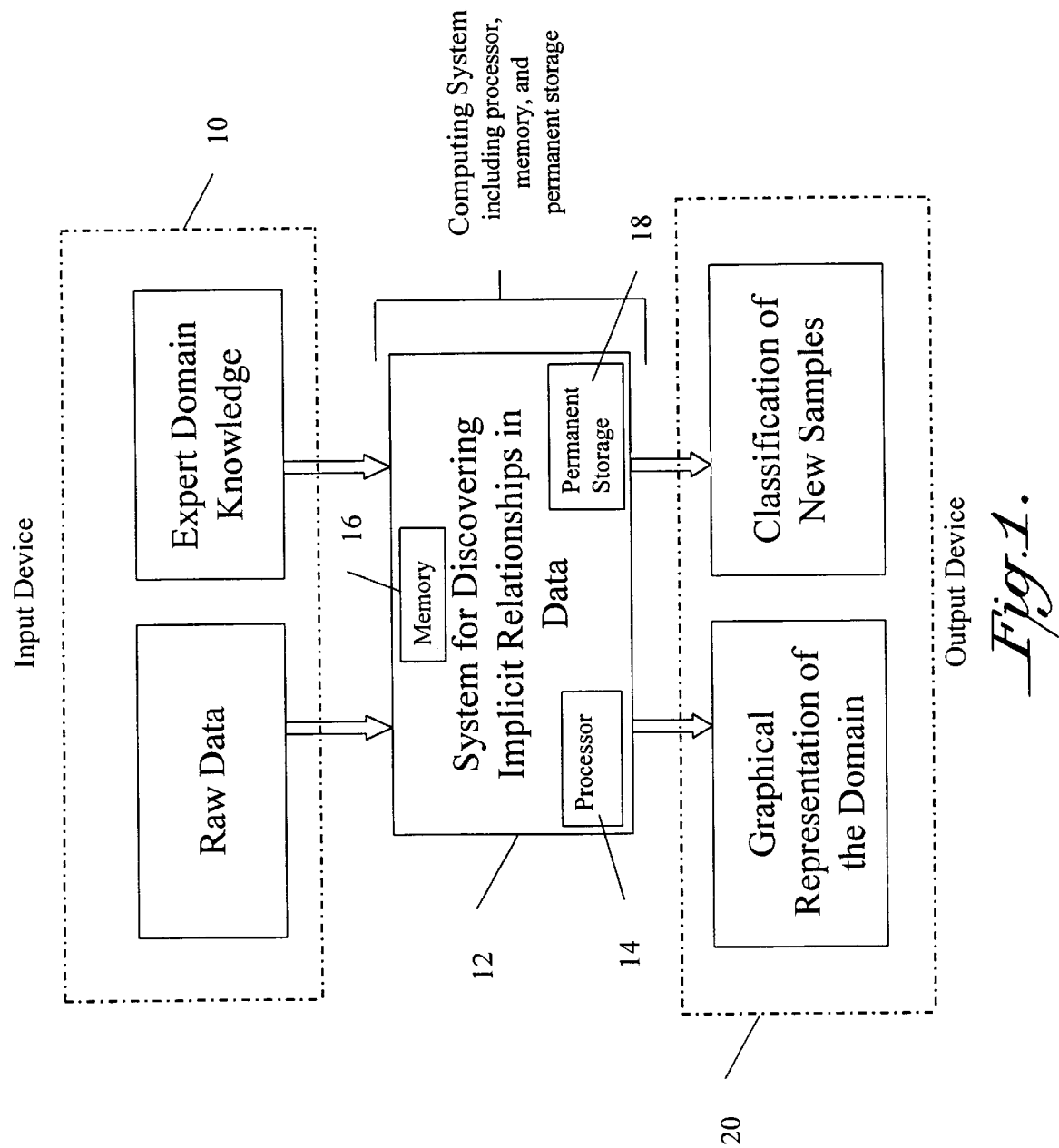
FIG. 1 is a flow chart depicting the system and method for discovering implicit relationships in data in accordance with a preferred embodiment of the present invention.

Reference will now be made in detail to the present preferred embodiment of the invention, an example of which is illustrated in the accompanying drawings. Wherever possible, the same reference numbers will be used throughout the drawings to refer to the same or like parts.

The present invention is broadly drawn to a data processing and analysis system and method for discovering implicit or latent relationships in data. As used herein the term "implicit relationships in data" refers to those relationships within the data set that are not readily apparent to the user by visual inspection of the tabulated data set. The terms "latent relationships" and "hidden relationships" refer to these same relationships within the data set. The system and method take ASCII formatted data, with the samples, also called objects, in rows and features, also called variables or descriptors, in columns, and successfully perform any desired pre-processing, feature selection, and feature extraction. The system and method then perform correlation and probability calculations and using these results and any user-defined domain conditions, create a graphical representation of the data's most influential features, and any relationships discovered by the system to exist between them. The system and method classify new sample data and provide statistical justification for the classification based upon Bayesian statistics. The system and method also identify regions in the data space that are undersampled, and that would thus be inappropriate to use for predicting the classification of the new sample data. Unlike conventional data exploration systems and methods, the system and method of the present invention consider the class variable to be just another feature, and therefore can predict any state of any feature given the states of the other variables for that sample.

Persons skilled in the art will recognize that an apparatus, such as a data processing system, including a computer and other appropriate components, could be programmed or otherwise designed to facilitate the practice of the method of the invention. Such a system would include appropriate program means for executing the method of the invention. Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

The computer contains a central processing unit (CPU), a memory, and a permanent storage device. The CPU accesses data and computer programs from the permanent storage device, transfers the computer programs into the memory, and executes the computer programs once resident in the memory. One skilled in the art will appreciate that a computer suitable for practicing the preferred embodiment of the present invention can contain additional or different components. One skilled in the art will also appreciate that the amount of time required to practice or implement the preferred embodiment of the invention using a computer will decrease with the computer's increased processor speed and/or increased temporary memory (also referred to as working memory or short-term storage) capacity.

The present invention is capable of distinguishing between sufficiently sampled and undersampled sub-regions in a dataspace. Conventional classifier and data exploration systems either fail or neglect to incorporate this feature. The system and method of the present invention have the advantage of performing their classification based upon Bayesian statistics, and are unique in that they classify a sample based upon any feature and not just a class feature. The system and method treats all influential features with equal weight. Unlike conventional Bayesian classification techniques, the present invention is automated, includes data pre-processing, feature selection and extraction, and rejects the notion of causal relationships between variables.

As generally shown in FIG. 1, the present invention includes an input device 10 for inputting raw empirical data and expert domain knowledge into a computer system 12 having a central processing unit (CPU) 14, a memory 16, and a permanent storage device 18. The permanent storage device 18 stores the raw empirical data and expert domain knowledge, and CPU 14 performs calculations based upon the raw empirical data and expert domain knowledge. The computer 12 outputs a graphical representation of the domain and a classification of new sample data to an output device 20.

CPU 14 may comprise a microprocessor in any typical microprocessor-based computing device such as an IBM-compatible personal computer. CPU 14 may also be a central processing unit used in a server computer such as a mainframe or a workstation. Memory 16 may include a typical random access memory (RAM) used in a personal computer or a temporary memory storage device used in a server computer. Permanent storage device 18 may comprise a computer diskette, DASD array, magnetic tape, optical storage device, or other suitable data storage devices. Output device 20 may comprise a display device such as computer monitor, or a printing device such as a laser printer or a color printer.

Figure 2:
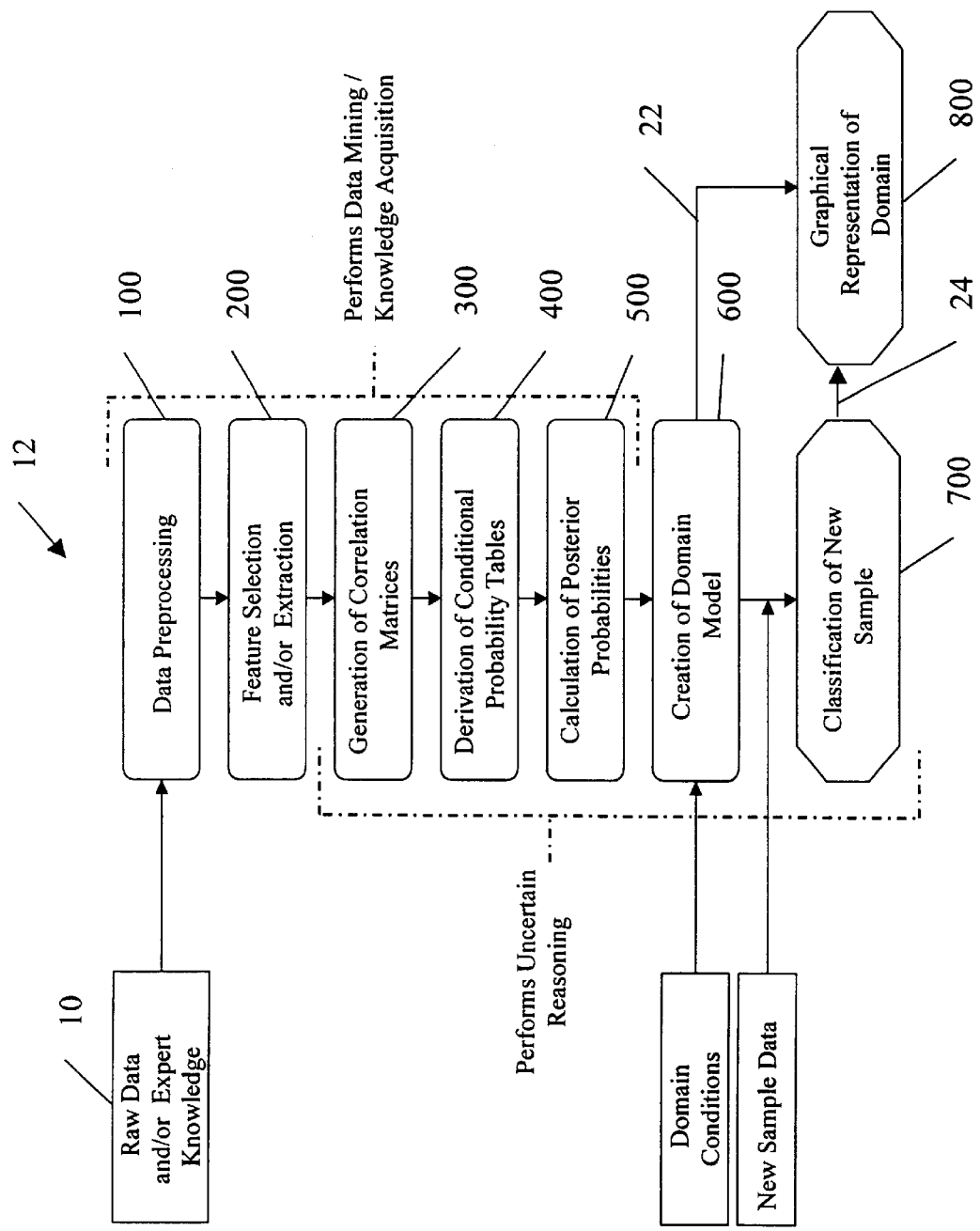
FIG. 2 is a flow chart depicting the preferred embodiment of the invention in further detail.

As embodied herein and as shown in FIG. 2, the present invention comprises a data processing and analysis system for discovering implicit relationships in data. The system comprises a means 10 for inputting raw empirical data, expert domain knowledge, domain conditions, and sample data. The inputting means 10 preferably comprises an input device, such as a keyboard. The system further includes computing means 12, described above, for receiving the raw empirical data and expert domain knowledge from inputting means 10. As shown in FIG. 2, CPU 14 stores the raw empirical data and expert domain knowledge in permanent storage device 18. CPU 14 then accesses data and computer programs from permanent storage device 18, transfers the computer programs into memory 16, and executes the computer programs once resident in memory 16. The computer program or software, in conjunction with CPU 14, performs a series of method steps upon the raw empirical data and expert domain knowledge. In accordance with the preferred embodiment of the present invention, the computer program pre-processes the raw empirical data and expert domain knowledge at step 100; selects and extracts features from the empirical data and expert domain knowledge at step 200; generates correlation matrices at step 300; derives conditional probability tables at step 400; calculates posterior probabilities at step 500; creates a domain model, including any domain conditions, for storage in memory 16 at step 600; and provides an output signal 22 representative of the domain and an output signal 24 representative of a classification of the new sample data at step 700. The system further includes output device 20 for receiving the output signal 22 representative of the domain and the output signal 24 representative of the classification of the new sample data, for graphically displaying the representation of the domain, and for displaying the classification of the data set.

Data preprocessing step 100 comprises any conventional data preprocessing technique known in the art, wherein the user of the system and method of the present invention chooses a data preprocessing technique that is appropriate for the raw data being analyzed. By way of example only, when gathering the raw data and/or expert knowledge, some techniques have utilized a data preprocessor for transforming raw data into usable data. The typical preprocessing operation utilizes a first data set, referred to as the original or "raw" data values, and the list of transforms that have been applied to the data. This therefore produces transformed variable values called "features". These transformed variables can include features that are unchanged from the original variables (raw values), features whose original variable (raw) values have been modified by the transforms, and newly created features generated by the transforms. Several other data preprocessing techniques may be used with the present invention, including but not limited to: derivative calculations, normalization, mean centering, variance scaling, autoscaling (mean-centering followed by variance scaling), and range scaling.

Feature selection and/or extraction step 200 comprises any conventional feature selection and/or extraction technique known in the art, wherein the user of the system and method of the present invention chooses a feature selection and/or extraction technique that is appropriate for the raw data being analyzed. Feature selection involves choosing those features resulting from preprocessing step 100 that are most likely to enhance the classification attempt. Feature extraction involves the creation of new features as being mathematical composites (sums, products, quotients, linear combinations, etc.) of the features that resulted from pre-processing step 100. By way of example, feature selection may include but is not limited to selecting features that result from preprocessing step 100 based on their direct relationship to the class variable. Likewise, feature extraction techniques may include a process such as performing an eigen-vector analysis of the features that result from preprocessing step 100 and using the resulting eigenvectors as newly extracted features in the following classification process.

The generation of correlation matrices, step 300, comprises generating correlation matrices from the matrices left over after the feature selection and/or extraction step 200 is completed. The calculation of a correlation matrix is literally a calculation of the "correlation coefficient" between each pair of features (utilizing every feature) in the dataset, and placing each correlation coefficient calculated at the location of intersection of each pair of features, such that only one half of the original size of the features matrix will be filled, and the diagonal of the new "correlation matrix" will consist of 1's. Specifically, the "correlation coefficient" between any two features is calculated by dividing the covariance between the two features by the product of the standard deviations of the features, and is bounded in value by −1 and 1; a calculation defined in any standard statistics text. Derivation of conditional probability tables, step 400, comprises using the selected and/or extracted feature data, as well as the features that are highly correlated (determined from the correlation matrices, step 300) to derive conditional probability tables of the correlated features. Conditional probability tables are calculated using standard Bayesian statistics, as defined in any standard statistics text, where the conditional probability of any feature being any specific value is calculated by dividing the "joint probability" of that feature being that specific value given that the other correlated features are specific values by the independent probability that the feature in question occupies that value. These probabilities are calculated using standard frequentist statistics and may also be found in any statistics text under an explanation of Bayesian statistics and Bayes' Rule.

The calculation of posterior probabilities, step 500, involves calculating the posterior probability for every data point and every selected and/or extracted feature using the conditional probability tables generated in step 400, and also follow Bayes' Rule and standard Bayesian statistics, and will therefore not be described explicitly herein. A calculation of conditional probability calculations can also be found in any standard statistics text under a description of Bayesian statistics and Bayes' Rule.

The creation of the domain model, step 600, literally comprises the interlacing of all of the information that the system has collected from the user (including raw data, expert information, and domain conditions) and stored in memory with all of the information (including which features are significant, and all calculated statistics) generated by the system's calculations such that when presented steps 700 and 800 may be made. This creation of the model is accomplished by a computer program that prompts the user for input and then generates instructions for which information to access and when, and also generates the output for the system to use in steps 700 and 800.

Graphical representation of the domain, step 800, comprises graphically generating a visual aid to represent each of the features found to be significantly related by the calculation of the correlation matrices, step 300, and a visual aid to represent the relationships found between those features. This representation can include but is not limited to a "network" or web type image generated where an oval, circle, or square could represent an individual feature, and a line or arrow connecting the represented features could represent the relationships between them. The graphical representation of the domain model is preferably outputted to output device 20.

Unlike conventional data exploration methods, the present invention graphically represents the implicit or latent relationships in a data set, indicating relationships between both class variables and feature variables. The system and method of the invention also semantically and statistically justify the classification results of a data set, and provide information regarding the practical relevance of the data set, including an indication of the undersampled regions of the data space, and a data analysis specific to a desired level of confidence, including but not limited to decision theoretical thresholding based upon minimum sub-space population whether measured as an absolute population number, a percentage of the total data set population, a percentage of the total class population, or a ratio of populations when compared with other subspace populations. In addition, this system can be adapted, accepting assumptions based on the Central Limit Theorem, to report classification results and subspace significance within chosen statistical confidence limits.

Further, the system and method of the invention can incorporate outside knowledge about the domain within the data set, classify a sample with respect to any variable, class or feature, easily handle missing data, and provide complete data analysis.

The invention will be further clarified by the following examples, which are intended to be purely exemplary of the invention. The system and method could be used to analyze chemical data, including biomedical data, environmental, atmospheric, and toxicological data, and chromatographic and spectroscopic data. The system and method of the invention could also be used to analyze sociological data, medical data such as triage, diagnostic, and mortality information, and mechanical data such as the properties of a car that fails to start. Furthermore, the system and method may also be used to create a tool for training people to analyze data in these same domains. For example, the system and method could be used to train chemistry students how to interpret spectra or chromatograms, or train medical students how to diagnose certain illnesses.

It will be apparent to those skilled in the art that various modifications and variations can be made in the system and method for discovering implicit relationships in data of the present invention and in construction of this system and method without departing from the scope or spirit of the invention. As an example, the system and method will provide the implicit relationships in the data more quickly if a faster computer processor and/or a larger computer memory are utilized.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A data processing and analysis system for discovering implicit relationships in data, comprising:

means for inputting empirical data, expert domain knowledge, domain conditions, and sample data;

a computing means for receiving the empirical data and expert domain knowledge from the means for inputting empirical data, the computing means having a memory means connected to a processing means, wherein the processing means stores the empirical data and expert domain knowledge in the memory means, preprocesses the empirical data and expert domain knowledge, selects and extracts features from the empirical data and expert-domain knowledge, generates correlation matrices, derives conditional probability tables, calculates posterior probabilities, creates a domain model, incorporating any user-defined domain conditions, for storage in the memory means, provides an output signal representative of the domain, and provides an output signal representing a classification of the sample data; and means for receiving the output signal representative of the domain and the output signal representing the classification of the sample data, for graphically displaying the representation of the domain, and for displaying the classification of the sample data.

2. A data processing and analysis method in a computer system for discovering implicit relationships in data using an input means and a display means connected to a computing means having a memory means connected to a processing means, the method comprising the steps of:

inputting empirical data, expert domain knowledge, domain conditions, and sample data to the computing means, via the input means;

receiving the empirical data and expert domain knowledge in the computing means;

utilizing the processing means to store the empirical data and expert domain knowledge in the memory means, to pre-process the empirical data and expert domain knowledge, to select and extract features from the empirical data and expert domain knowledge, to generate correlation matrices, to derive conditional probability tables, to calculate posterior probabilities, to create a domain model, incorporating any user-defined domain conditions, for storage in the memory means, to provide an output signal representative of the domain, and to provide an output signal representing a classification of the sample data;

receiving the output signal representative of the domain and the output signal representing the classification of the sample data in the display means;

graphically displaying the representation of the domain on the display means; and displaying the classification of the sample data on the display means.

3. A computer program product for use with a computer system for directing the system to discover implicit relationships in data, the computer program product comprising:

a computer readable medium;

means, provided on the computer readable medium, for directing the system to receive empirical data, expert domain knowledge, domain conditions, and sample data;

means, provided on the computer readable medium, for storing the empirical data and expert domain knowledge in the computer readable medium;

means, provided on the computer readable medium, for pre-processing the empirical data and expert domain knowledge;

means, provided on the computer readable medium, for selecting and extracting features from the empirical data and expert domain knowledge;

means, provided on the computer readable medium, for generating correlation matrices;

means, provided on the computer readable medium, for deriving conditional probability tables;

means, provided on the computer readable medium, for calculating posterior probabilities;

means, provided on the computer readable medium, for creating a domain model, incorporating any user-defined domain conditions, for storage in the computer readable medium;

means, provided on the computer readable medium, for providing an output signal representative of the domain, and an output signal representing a classification of the sample data;

means, provided on the computer readable medium, for receiving the output signal representative of the domain and the output signal representing the classification of the sample data in the display means;

means, provided on the computer readable medium, for graphically displaying the representation of the domain on a display means; and means, provided on the computer readable medium, for displaying the classification of the sample data on the display means.

* * * * *